United States Patent [19]

Sakano et al.

[11] 4,444,950
[45] Apr. 24, 1984

[54] THERMOPLASTIC RESIN COMPOSITION

[75] Inventors: Hajime Sakano, Hirakata; Akitoshi Ito, Nabari; Motoichi Yano, Settsu; Yasuhiro Honda, Toyonaka, all of Japan

[73] Assignee: Sumitomo Naugatuck Co., Ltd., Osaka, Japan

[21] Appl. No.: 471,105

[22] Filed: Mar. 1, 1983

[30] Foreign Application Priority Data

Mar. 15, 1982 [JP] Japan .................................. 57-41489
Mar. 29, 1982 [JP] Japan .................................. 57-51768

[51] Int. Cl.$^3$ .......................................... C08L 69/00
[52] U.S. Cl. ...................................... 525/67; 525/74; 525/75; 525/146
[58] Field of Search ........................................ 525/67

[56] References Cited

U.S. PATENT DOCUMENTS 3,891,719 6/1975 Schirmer et al. ..................... 525/67
3,954,905 5/1976 Margotte et al. ..................... 525/67

Primary Examiner—J. Ziegler

[57] ABSTRACT

A thermoplastic resin composition improved in weld strength which comprises (A) a polycarbonate resin and (B) a rubber modified copolymer with (C) an epoxy group-containing olefin copolymer.

7 Claims, No Drawings

THERMOPLASTIC RESIN COMPOSITION

The present invention relates to a thermoplastic resin composition. More particularly, it relates to a thermoplastic resin composition comprising a polycarbonate resin which has excellent physical properties such as impact resistance and heat resistance with improved weld strength.

Polycarbonate resins have excellent physical properties, particularly high impact resistance and heat resistance, and are known as "engineering plastics". It is also known to blend various resins into polycarbonate resins to enhance the physical properties of polycarbonate resins and improve their resistance to deterioration. For instance, incorporation of ABS resins (acrylonitrile-butadiene-styrene copolymer), MBS resins (methyl methacrylate-butadiene-styrene copolymer) or ABSM resins (acrylonitrile-butadiene-styrene-methyl methacrylate copolymer) into polycarbonate resins is effective in improving moldability and reducing the thickness dependency of impact resistance (Japanese Patent Publns. (examined) Nos. 15225/1963, 71/64, 11496/67 and 11142/76). Further, for instance, incorporation of AES resins (acrylonitrile-ethylene/propylene rubber-styrene copolymer) into polycarbonate resins is effective in improving weather resistance and stain resistance (Japanese Patent Publn. (unexamined) No. 48547/1973).

In injection molding which is the most popular molding procedure, the number of gates and the flow state of resin are required to be changed depending upon the form and size of a molding product. Because of this fact, there is unavoidably produced crossing of the resin flowing in different directions, from which a weld part is formed. The weld part of a molded product made of a conventional thermoplastic resin composition comprising a polycarbonate resin incorporated with a rubber modified copolymer is usually insufficient in strength, and this is a great drawback for practical use.

As a result of extensive study, it has now been found that the incorporation of an epoxy group-containing olefin copolymer into a thermoplastic resin composition comprising a polycarbonate resin and a rubber modified copolymer affords a resinous composition having excellent physical properties such as impact resistance and heat resistance with improved weld strength.

According to this invention, there is provided a thermoplastic resin composition improved in physical properties, particularly in weld strength which comprises (A) a polycarbonate resin and (B) a rubber modified copolymer with (C) an epoxy group-containing olefin copolymer.

As the polycarbonate resin which is the component (A), there are exemplified aliphatic polycarbonates, aromatic polycarbonates, aliphatic-aromatic polycarbonates, etc. Usually, polymers and copolymers of bisphenols such as bis(4-hydroxyphenyl)alkanes, bis(4-hydroxyphenyl)ethers, bis(4-hydroxyphenyl)sulfones, bis(4-hydroxyphenyl)sulfides and bis(4-hydroxyphenyl)sulfoxides and/or halogenated bis-phenols are employed. Typical examples of polycarbonate resins and their production are described in various text-books and literature including Encyclopedia of Polymer Science and Technology, Vol. 10, pages 710 to 764 (1969).

The rubber modified copolymer which is the component (B) is obtainable by polymerizing at least two kinds of monomers chosen from aromatic vinyl compounds, vinyl cyanides and alkyl esters of unsaturated carboxylic acids in the presence of rubbers. The resulting product comprises (b-1) a copolymer comprising units of the rubber and units of the monomers graft polymerized thereon (hereinafter referred to as "graft copolymer") usually with (b-2) a copolymer comprising units of the monomers (hereinafter referred to as "copolymer"). Alternatively, the graft copolymer (b-1) and the copolymer (b-2) may be separately produced and combined together to make a uniform composition usable as the component (B). In general, the rubber modified copolymer (B) comprises the graft copolymer (b-1) and the copolymer (b-2) respectively in amounts of 10 to 100% by weight and of 90 to 0% by weight on the basis of the weight of the rubber modified copolymer (B). When the content of the graft copolymer (b-1) is less than 10% by weight, the ultimate composition will be insufficient in impact resistance.

The weight proportion of the rubber and the monomers in the graft copolymer (b-1) is normally from 5:95 to 70:30. The composition of the monomers is not critical and may comprise, for instance, an aromatic vinyl compound(s) in a content of 50 to 80% by weight and a vinyl cyanide(s) and/or an alkyl ester of unsaturated carboxylic acid(s) in a content of 50 to 20% by weight. No particular restriction is present on the particle size of the graft copolymer (b-1), and it may be usually from 0.05 to 5 microns, favorably from 0.1 to 0.5 microns.

The composition of the monomers in the copolymer (b-2) is also not critical and may comprise, for instance, an aromatic vinyl compound(s) in a content of 50 to 90% by weight and a vinyl cyanide(s) and/or an alkyl ester of unsaturated carboxylic acid(s) in a content of 50 to 10% by weight. No special limitation is present on the intrinsic viscosity of the copolymer (b-2), and it may be ordinarily from 0.60 to 1.50 (when determined in dimethylformamide at 30° C.).

Examples of the rubber for the graft copolymer (b-1) are polybutadiene, styrene/butadiene copolymer, acrylonitrile/butadiene copolymer, ethylene/propylene copolymer, ethylene/propylene/non-conjugated diene copolymer (e.g. dicyclopentadiene, ethylidenenorbornene, 1,4-cyclohexadiene, 1,4-cycloheptadiene, 1,5-cyclooctadiene), ethylene/vinyl acetate copolymer, chlorinated polyethylene, polyalkyl acrylate, etc. In case of the ethylene/propylene copolymer or the ethylene/propylene/non-conjugated diene copolymer, the molar ratio of ethylene and propylene may be from 5:1 to 1:3. The non-conjugated diene content in the ethylene/propylene/non-conjugated diene copolymer is preferred to be from 2 to 50 in terms of iodine value. Examples of the aromatic vinyl compound(s) are styrene, α-methylstyrene, methyl-α-methylstyrene, vinyltoluene, monochlorostyrene, etc. Examples of the vinyl cyanide(s) are acrylonitrile, methacrylonitrile, etc. Examples of the alkyl ester of unsaturated carboxylic acid(s) are alkyl acrylates (e.g. methyl acrylate, ethyl acrylate, butyl acrylate), alkyl methacrylates (e.g. methyl methacrylate, ethyl methacrylate, butyl methacrylate), hydroxyalkyl acrylates (e.g. hydroxyethyl acrylate, hydroxypropyl acrylate), hydroxyalkyl methacrylate (e.g. hydroxyethyl methacrylate, hydroxypropyl methacrylate), etc.

For preparation of the rubber modified copolymer (B), there may be adopted any conventional polymerization procedure such as emulsion polymerization, suspension polymerization, bulk polymerization, solution polymerization, emulsion-suspension polymerization and bulk-suspension polymerization.

In the thermoplastic composition of the invention, the weight proportion of the polycarbonate resin (A) and the rubber modified copolymer (B) may be from 10:90 to 90:10. When the content of the polycarbonate resin (A) is smaller than the lower limit, the heat resistance and the weld strength are much lower. When the content is larger than the upper limit, the moldability is remarkably lower. In addition, the appearance is so deteriorated as not suitable for practical use.

The epoxy group-containing olefin copolymer (C) is a copolymer of at least one unsaturated epoxy compound and at least one olefin with or without at least one ethylenically unsaturated compound. While no special limitation is present on the composition of these monomers, the content of the unsaturated epoxy compound(s) is preferred to be from 0.05 to 95% by weight.

As the unsaturated epoxy compound(s), there may be used to ones having an unsaturated group copolymerizable with an olefin and an ethylenically unsaturated compound as well as an epoxy group in the molecule. For instance, unsaturated glycidyl esters, unsaturated glycidyl ethers, epoxyalkenes, p-glycidylstyrenes, etc. are usable. Those of the following formulas are also usable:

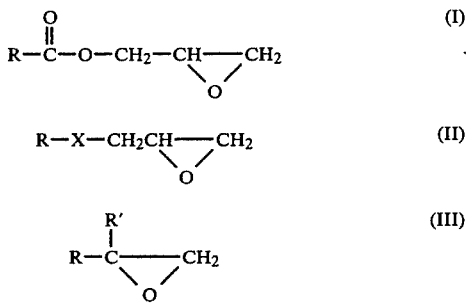

wherein R is a $C_2$-$C_{18}$ hydrocarbon group having an ethylenic unsaturation, R' is a hydrogen atom or a methyl group and X is —$CH_2O$—,

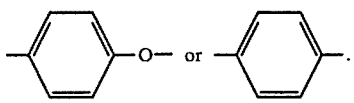

More specifically, the following compounds are exemplified: glycidyl acrylate, glycidyl methacrylate, glycidyl itaconate, butenecarboxylates, allyl glycidyl ether, 2-methylallyl glycidyl ether, styrene-p-glycidyl ether, 3,4-epoxybutene, 3,4-epoxy-3-methyl-1-butene, 3,4-epoxy-1-pentene, 3,4-epoxy-3-methylpentene, 5,6-epoxy-1-hexene, vinylcyclohexene monoxide, p-glycidyl-styrene, etc.

Examples of the olefin(s) are ethylene, propylene, butene-1, 4-methylpentene-1, etc.

As the ethylenically unsaturated compound(s), there are exemplified olefins, vinyl esters having a $C_2$-$C_6$ saturated carboxylic acid moiety, acrylic and methacrylic esters having a $C_1$-$C_8$ saturated alcohol moiety, maleic esters having a $C_1$-$C_8$ saturated alcohol moiety, vinyl halides, vinyl ethers, N-vinyllactams, carbonamides, etc. These ethylenically unsaturated compounds may be copolymerized with the unsaturated epoxy compounds and the olefins in an amount of not more than 50% by weight, especially from 0.1 to 45% by weight based on the total weight of the monomers to be copolymerized.

The epoxy group-containing olefins copolymer (C) may be prepared by various procedures, of which one typical example comprises contacting an unsaturated epoxy compound and an olefin with or without an ethylenically unsaturated compound onto a radical generating agent at a temperature of 40° to 300° C. under a pressure of 50 to 4000 atm. Another typical example comprises irradiating gamma-rays to a mixture of polypropylene with an unsaturated epoxy compound under a high degree of reduced pressure.

No particular restriction is present on the amount of the epoxy group-containing olefin copolymer (C) to be incorporated, and it may be usually from 0.1 to 40 parts by weight to 100 parts by weight of the total weight of the polycarbonate resin (A) and the rubber modified copolymer (B). When the amount is less than the lower limit, a satisfactory dispersibility is not assured. When more than the upper limit, layer separation is apt to be produced in the molded product. In view of the impact strength, weld strength and processability of the thermoplastic resin composition, the amount of from 0.5 to 10 parts by weight is particularly preferable.

For preparation of the thermoplastic resin composition of the invention, the said essential components may be mixed together in any optional order. For instance, all of them may be mixed together. Further, for instance, two of them may be first mixed together, followed by introduction of the remaining one into the resultant mixture. Mixing may be achieved by the use of any conventional mixing apparatus such as Bumbury mixer, a monoaxial extruder or a biaxial extruder. If desired, any other resin such as a polyolefin resin (e.g. polyethylene, polypropylene, ethylene/propylene copolymer) and/or any additive(s) such as dyestuffs, pigments, stabilizers, plasticizers, antistatic agents, ultraviolet ray absorbers, flame retardant agents, lubricants and fillers may be incorporated into the thermoplastic resin composition.

Practical and presently preferred embodiments of the invention are illustratively shown in the following Examples wherein % and part(s) are by weight unless otherwise indicated.

EXAMPLES 1 TO 10 AND COMPARATIVE EXAMPLES 1 TO 7

According to the presciption as shown in Table 1 or 2, the polycarbonate resin (A), the rubber modified copolymer (B) and the epoxy group-containing olefin copolymer (C) or polyethylene were mixed together to obtain a thermoplastic resin composition, of which the physical properties are shown in Table 1 or 2.

Among the resins or polymers as used, the polycarbonate resin (A) and the polyethylene resin were commercially available ones. The rubber modified copolymer (B) and the epoxy group-containing olefin copolymer (C) were prepared as set forth hereinbelow.

Polycarbonate resin (A):

"Panlite L-1250W" manufactured by Teijin Chemical.

Rubber modified copolymer (B) (No. 1):

Graft copolymer (b-1)

Polybutadiene (gel content, 90%) (50 parts (in terms of solid)), potassium persulfate (0.5 part), potassium olefinate (0.5 part) and dodecylmercaptan (0.5 part)

were mixed together, styrene (36 parts) and acrylonitrile (14 parts) were added thereto, and polymerization was carried out at 70° C. for 3 hours, followed by aging for 1 hour. The reaction mixture was subjected to salting out, dehydration and drying to give a graft copolymer of 0.3 to 0.4 micron in particle size.

Copolymer (b-2)

To a mixture of styrene (70 parts) and acrylonitrile (30 parts), t-dodecylmercaptan (0.1 part) was added, and the resultant mixture was subjected to pre-polymerization in a bulk state at 90° C. for 3 hours. Water (210 parts), methylcellulose (1.0 part) and benzoyl peroxide (0.3 part) were added thereto. The resulting aqueous dispersion was heated from 30° C. to 90° C., and polymerization in a dispersion state was carried out for 10 hours. Removal of the water gave a copolymer having an intrinsic viscosity of 0.50 (when determined in dimethylformamide at 30° C.).

Rubber modified copolymer (B) (No. 2):

Graft copolymer (b-1)

Ethylene/propylene/non-conjugated diene copolymer (EPDM) (iodine value, 8.5; Mooney viscosity, 61; propylene content, 43% by weight; non-conjugated diene component, ethylidenenorbornene) (150 parts) was dissolved in a mixture of n-hexane (3000 parts) and dichloroethylene (1500 parts). Styrene (300 parts), acrylonitrile (150 parts) and benzoyl peroxide (11 parts) were added thereto, and polymerization was carried out at 65° C. for 10 hours in nitrogen atmosphere. The reaction mixture was contacted with a greatly excessive amount of methanol. The precipitate was collected by filtration and dried to give a graft copolymer (rubber content, about 24%).

Copolymer (b-2)

To a mixture of styrene (70 parts) and acrylonitrile (30 parts), t-dodecylmercaptan (0.1 part) was added, and the resultant mixture was subjected to pre-polymerization in a bulk state at 90° C. for 3 hours. Water (210 parts), methylcellulose (1.0 part) and benzoyl peroxide (0.3 part) were added thereto. The resulting aqueous dispersion was heated from 30° C. to 90° C., and polymerization in a dispersion state was carried out for 10 hours. Removal of the water gave a copolymer having an intrinsic viscosity of 0.50 (when determined in dimethylformamide at 30° C.).

Epoxy group-containing olefin copolymer (C):

Into an autoclave, compressed ethylene (2000 kg/cm$^2$), glycidyl methacrylate and vinyl acetate were charged together with di-t-butyl peroxide as a catalyst, and the mixture was stirred at 150° to 300° C. for several minutes while stirring, whereby bulk-polymerization proceeded. The reaction mixture was passed through a separator to collect an epoxy group-containing olefin copolymer.

Polyethylene resin:

"Sumikathen Hard 2703" manufactured by Sumitomo Chemical.

The weld strength was determined as follows:

A molten resin (200° C.) was injected from two gates (each being 2.5×2.0 mm) having a gate distance of 100 mm to make a test piece of 150 mm long, 150 mm wide and 3 mm high. The test piece was placed on a cylinder of 120 mm in inner diameter, 126 mm in outer diameter and 80 mm in height. A steel ball of 1 kg was dropped onto the central part of the test piece in a room kept at −30° C., and the maximum energy (kg.cm) not breaking the test piece was measured.

TABLE 1

| | Test No. | | | | | | | |
|---|---|---|---|---|---|---|---|---|
| | Example | | | | | Comparative Example | | |
| Composition | 1 | 2 | 3 | 4 | 5 | 1 | 2 | 3 |
| Polycarbonate resin (A) (part(s)) | 40 | 50 | 50 | 60 | 70 | 50 | 60 | 50 |
| Rubber modified copolymer (B) (No. 1) (part(s)) | | | | | | | | |
| Graft copolymer (b-1) | 25 | 30 | 15 | 20 | 10 | 30 | 20 | 30 |
| Copolymer (b-2) | 35 | 20 | 35 | 20 | 20 | 20 | 20 | 20 |
| Epoxy group-containing olefin copolymer (C) (part(s)) | | | | | | | | |
| E-GMA-VA*$^1$ | 3 | — | 3 | — | 2 | — | — | — |
| E-GMA*$^2$ | — | 2 | — | 1.5 | — | — | — | — |
| Polyethylene (part(s)) | — | — | — | — | — | — | — | 3 |
| Weld strength (DuPont impact strength at weld line) (−30° C.) (kg.cm) | >200 | >200 | 190 | >200 | 180 | 20 | 25 | 45 |
| Notched Izod impact strength (20° C.) (kg.cm/cm$^2$) | 48.6 | 56.6 | 48.5 | 52.0 | 51.0 | 55.0 | 56.3 | 53.2 |
| Heat distortion temperature (264 psi, no annealing) (°C.) | 100.5 | 105.0 | 106.0 | 108.7 | 112.3 | 105.2 | 106.5 | 105.8 |
| Processability (Koka-type flow tester, 230° C., 60 kg/cm$^2$) (ml/min) | 0.51 | 0.50 | 0.55 | 0.48 | 0.42 | 0.50 | 0.56 | 0.58 |
| Flexural modulus, × 10$^4$ (kg/cm$^2$) | 2.0 | 2.1 | 2.2 | 2.15 | 2.25 | 2.1 | 2.2 | 2.05 |

*$^1$Ethylene/glycidyl methacrylate/vinyl acetate copolymer (90:7:3).
*$^2$Ethylene/glycidyl methacrylate copolymer (90:10).

TABLE 2

| | Test No. | | | | | | | | |
|---|---|---|---|---|---|---|---|---|---|
| | Example | | | | | Comparative Example | | | |
| Composition | 6 | 7 | 8 | 9 | 10 | 4 | 5 | 6 | 7 |
| Polycarbonate resin (A) (part(s)) | 45 | 55 | 60 | 70 | 55 | 60 | 95 | 55 | 55 |

TABLE 2-continued

| Composition | Example 6 | Example 7 | Example 8 | Example 9 | Example 10 | Comparative Example 4 | Comparative Example 5 | Comparative Example 6 | Comparative Example 7 |
|---|---|---|---|---|---|---|---|---|---|
| Rubber modified copolymer (B) (No. 2) (part(s)) | | | | | | | | | |
| Graft copolymer (b-1) | 25 | 25 | 15 | 15 | 25 | 15 | 5 | 3 | 25 |
| Copolymer (b-2) | 30 | 20 | 25 | 15 | 20 | 25 | 0 | 42 | 20 |
| Epoxy group-containing olefin copolymer (C) (part(s)) | | | | | | | | | |
| E-GMA-VA*[1] | 2.0 | 0 | 2.5 | 2.0 | 0 | 0 | 0 | 3.0 | 0 |
| E-GMA*[2] | 0 | 2.0 | 0 | 0 | 0 | 0 | 0 | 0 | 0 |
| Polyethylene (part(s)) | — | — | — | — | — | — | — | — | 3.0 |
| Weld strength (DuPont impact strength at weld line) (−30° C.) (kg.cm) | >200 | >200 | >200 | >190 | 20 | 20 | 30 | <10 | <10 |
| Notched Izod impact strength (20° C.) (kg.cm/cm$^2$) | 51.5 | 58.5 | 48.0 | 50.0 | 57.5 | 49.5 | 25.0 | 27.0 | 56.5 |
| Heat distortion temperature (264 psi, no annealing) (°C.) | 100.5 | 103.7 | 105.5 | 108.6 | 103.0 | 105.0 | 119.5 | 104.0 | 102.5 |
| Processability (Koka-type flow tester, 230° C., 60 kg/cm$^2$) (ml/min) | 0.50 | 0.48 | 0.47 | 0.43 | 0.48 | 0.47 | 0.10 | 0.55 | 0.50 |
| Flexural modulus, × 10$^4$ (kg/cm$^2$) | 2.1 | 2.0 | 2.2 | 2.25 | 2.0 | 2.23 | 2.2 | 2.35 | 2.0 |

Note: *[1] and *[2] same as in Table 1.

What is claimed is:

1. A thermoplastic resin composition having improved weld strength which comprises a blend of (A) a polycarbonate resin and (B) a rubber modified copolymer prepared by polymerizing at least two kinds of monomers chosen from the group consisting of aromatic vinyl compounds, vinyl cyanides and alkyl esters of unsaturated carboxylic acids in the presence of a rubber, with (C) an epoxy group-containing olefin copolymer comprising a copolymer of at least one unsaturated epoxy compound and at least one olefin, wherein (B) comprises (b-1) a graft copolymer comprising units of the monomers and units of the rubber and (b-2) a copolymer comprising units of the monomers, and wherein the content of (b-1) is at least 10% by weight.

2. The composition according to claim 1, wherein the rubber modified copolymer (B) comprises a copolymer obtained by polymerizing at least two kinds of monomers chosen from the group consisting of aromatic vinyl compounds, vinyl cyanides and alkyl esters of unsaturated carboxylic acids in the presence of at least one rubber chosen from the group consisting of conjugated diene rubbers and ethylene—propylene rubbers.

3. The composition according to claim 1, wherein the weight proportion of the polycarbonate resin (A) and the rubber modified copolymer (B) is from 10:90 to 90:10.

4. The composition according to claim 1, wherein the amount of the epoxy group-containing olefin copolymer (C) is from 0.1 to 40 parts by weight to 100 parts by weight of the composition.

5. The composition according to claim 1, wherein the amount of the epoxy group-containing olefin copolymer (C) is from 0.5 to 10 parts by weight to 100 parts by weight of the composition.

6. The composition according to claim 3, wherein the amount of the epoxy group-containing olefin copolymer (C) is from 0.1 to 40 parts by weight to 100 parts by weight of the composition.

7. The composition as in claim 6 wherein (b-1) and (b-2) are separately formed and combined together.

* * * * *